(No Model.)
E. SAMSON.
FRUIT OR VEGETABLE CUTTER OR GRATER.
No. 477,826. Patented June 28, 1892.
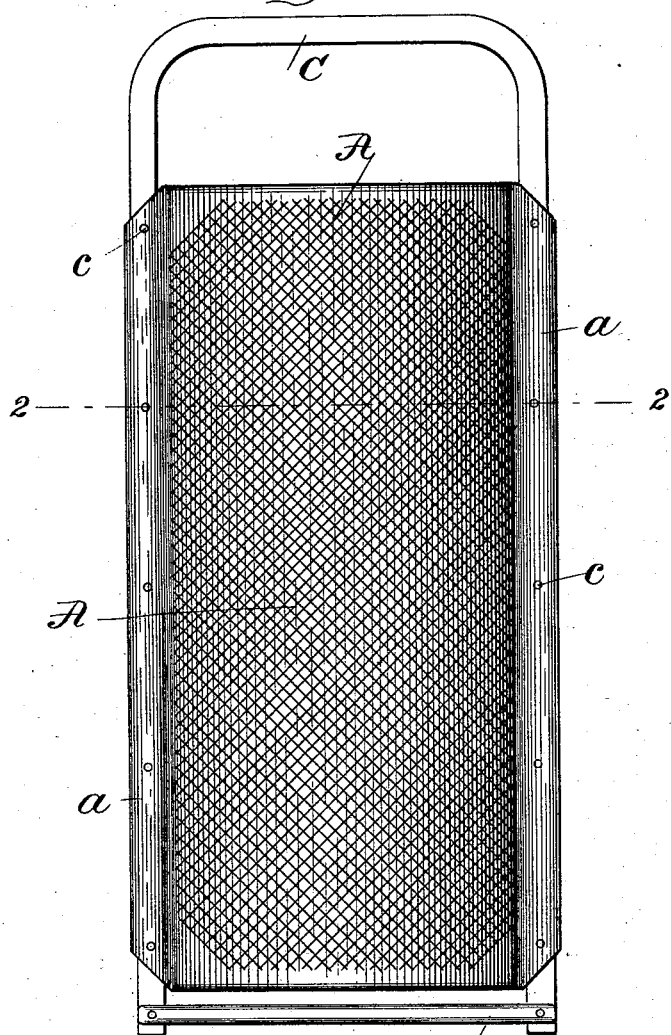
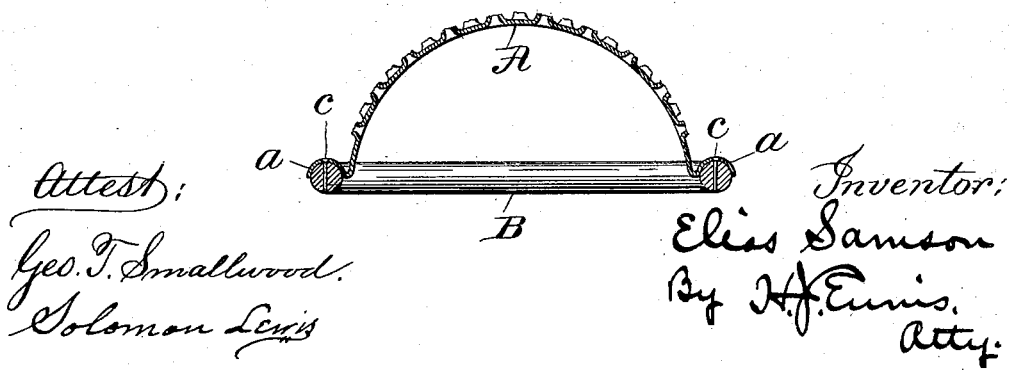
Attest:
Geo. T. Smallwood.
Solomon Lewis.
Inventor:
Elias Samson
By H. J. Ennis.
Atty.

UNITED STATES PATENT OFFICE.

ELIAS SAMSON, OF NEW YORK, N. Y., ASSIGNOR OF ONE-HALF TO DAVIS LOUDON, OF SAME PLACE.

FRUIT OR VEGETABLE CUTTER OR GRATER.

SPECIFICATION forming part of Letters Patent No. 477,826, dated June 28, 1892.

Application filed February 27, 1892. Serial No. 423,058. (No model.)

*To all whom it may concern:*

Be it known that I, ELIAS SAMSON, a citizen of the United States, residing at New York, in the county of New York and State of New York, have invented certain new and useful Improvements in Fruit or Vegetable Cutters or Graters; and I do declare the following to be a full, clear, and exact description of the invention, such as will enable others skilled in the art to which it appertains to make and use the same, reference being had to the accompanying drawings, and to the letters of reference marked thereon, which form a part of this specification.

My invention has relation to graters or cutters for fruit and vegetables, and the object is to provide a simple, cheap, and inexpensive device of this kind that will have the highest hygienic advantages; and to these ends the novelty consists in the construction and combination of the parts of the same, as will be hereinafter more fully described and particularly pointed out in the claim.

The same letters refer to like parts of the invention.

Figure 1 is a front view of my improved greater, and Fig. 2 is a cross-section on the line 2 2 of Fig. 1.

A is a sheet of metal, the convex surface of which is provided with the usual abrading or grating face common to this class of utensils. The parallel sides of the grater are stamped up in a semicircular form, as shown at $a\ a$, and these not only serve to stiffen the sheet, but form seats for the bail B, which is formed of a single piece of rattan or reed, which is bent to form a handle C, and the free parallel ends of which are snugly seated in the semicircular seats $a\ a$ of the sheet A and is suitably secured therein by rivets or brads $c$. The upper and lower ends $b\ b$ are beaded or bent over to stiffen the metal, and a brace E serves to brace the extreme ends of the bail B to prevent spreading, and the handle C serve the same function for the upper end.

It will be noticed that the contact of the sheet metal with the rattan leaves no chance for rust to form or galvanic action to take place, as would be the case if the bail were made of wire, as is commonly used in graters.

The device is light, cheap, and easily kept clean, and the semicircular or beaded seats $a\ a$ serve to give stiffness and rigidity to the whole.

Having thus fully described my invention, what I claim as new and useful, and desire to secure by Letters Patent of the United States, is—

An improved article of manufacture, consisting of the grater-sheet A, having parallel semicircular sides $a\ a$, and the bail B, constructed of a single piece of rattan, circular in cross-section and having its free parallel ends suitably secured in the semi-cylindrical sides $a\ a$ of the grater-sheet A, substantially as shown and described.

In testimony whereof I affix my signature in presence of two witnesses.

ELIAS SAMSON.

Witnesses:
HENRY J. ENNIS,
SOLOMON LEWIS.